United States Patent [19]

Kurihara et al.

[11] Patent Number: 4,825,059
[45] Date of Patent: Apr. 25, 1989

[54] APPARATUS FOR RECORDING AND REPRODUCING INFORMATION

[75] Inventors: Hitoshi Kurihara, Yorii; Kenichi Suzuki; Kazuo Minoura, both of Yokohama, all of Japan

[73] Assignees: Canon Kabushiki Kaisha; Canon Denshi Kabushiki Kaisha, both of Tokyo, Japan

[21] Appl. No.: 921,488

[22] Filed: Oct. 22, 1986

[30] Foreign Application Priority Data

Oct. 25, 1985 [JP] Japan .................................. 60-239199
Oct. 29, 1985 [JP] Japan .................................. 60-240469

[51] Int. Cl.$^4$ .......................................... G06K 13/06
[52] U.S. Cl. .................................... 235/483; 235/475; 235/485; 271/240
[58] Field of Search ............... 235/449, 458, 483, 485, 235/475; 360/2; 271/240, 248, 250

[56] References Cited

U.S. PATENT DOCUMENTS

2,439,420  4/1948  Eckhard et al. .................... 271/240
3,787,661  1/1974  Moorman et al. .................. 360/2 X
4,358,103  11/1982 Koike et al. ..................... 235/449 X

*Primary Examiner*—David L. Trafton
*Attorney, Agent, or Firm*—Fitzpatrick, Cella, Harper & Scinto

[57] ABSTRACT

In an apparatus for recording and reproducing information, an information recording medium is reciprocated relative to a head for effecting information recording and reproduction, under such conditions that one end of the recording medium is urged against a guide member extending in a direction of the reciprocation of the recording medium.

6 Claims, 9 Drawing Sheets

APPARATUS FOR RECORDING AND REPRODUCING INFORMATION

BACKGROUND OF THE INVENTION

The present invention relates to an apparatus for recording and/or reproducing information by reciprocating an information recording medium relative to a recording/reproducing head and, more particularly, to a card carrier mechanism for stably reciprocating a card-like information recording medium.

The form of the information recording medium may be of a disk-like medium (e.g., a magnetic disk, an optical disk, and a magneto-optical disk), a tape-like medium (e.g., a magnetic tape and an optical tape), or a card-like medium (e.g., a magnetic card and an optical card). Among these media, the card-like information recording medium (to be referred to as a card hereinafter) has been popular due to its easy access, easy fabrication, and portability. In particular, an optical card can be used in high-density recording, and extensive studies thereon has been made in recent years. An optical card will be exemplified below.

A conventional information recording/reproducing apparatus using such a card scans data tracks in the card by reciprocating the card relative to a recording/reproducing head to achieve information recording/reproduction.

Figure 1A:
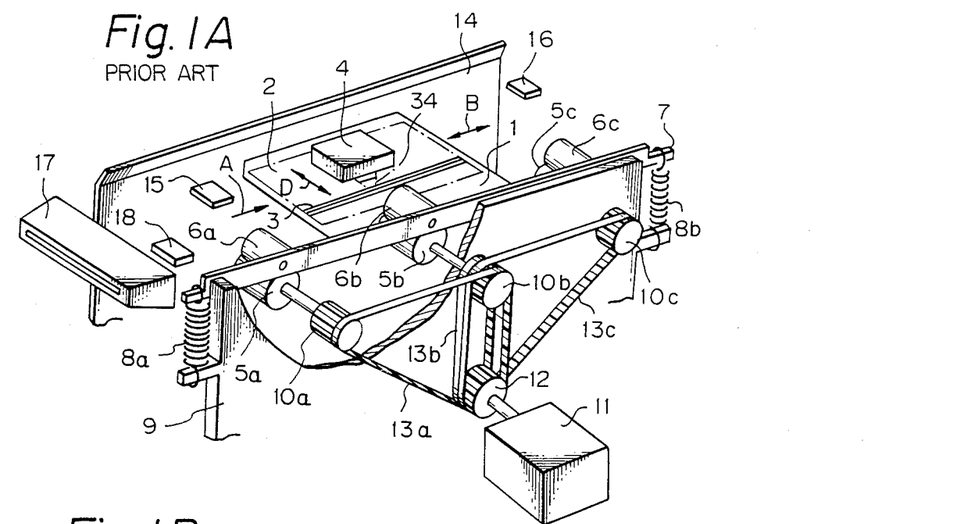
FIG. 1A is a perspective view of a card drive mechanism in a conventional information recording/reproducing apparatus.
Figure 1B:
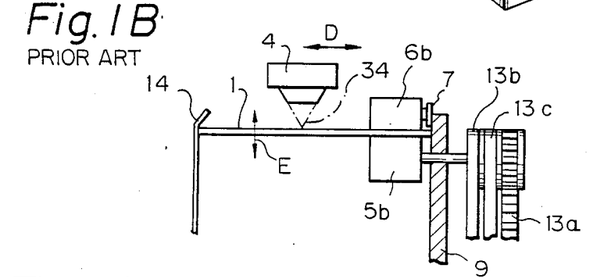
FIG. 1B is a schematic sectional view of the apparatus of FIG. 1A when viewed from a direction of arrow A.
Figure 1C:
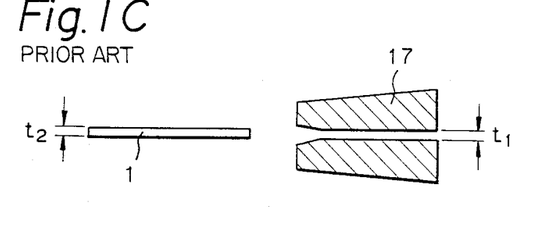
FIG. 1C is a schematic sectional view of a card insertion portion.

FIG. 1A is a perspective view of a card drive mechanism in a conventional information recording/reproducing apparatus, FIG. 1B is a schematic sectional view of the apparatus taken along a direction of arrow A thereof, and FIG. 1C is a schematic sectional view of a card insertion portion.

An optical card 1 has a recording area 2, and information is recorded as a pit train in the recording area 2. The pit trains are defined as information tracks 3, respectively. Each information track 3 is scanned to reproduce information. Information recording/reproduction can be performed by using an optical beam 34 from a head 4.

The optical card 1 is clamped between drive rollers 5a, 5b, and 5c and press rollers 6a, 6b, and 6c and can reciprocate along directions of the double-headed arrow B. For illustrative convenience, the drive roller 5a and the press roller 6a constitute a roller pair a; the rollers 5b and 6b, a roller pair b; and the rollers 5c and 6c, a roller pair c.

The press rollers 6a, 6b and 6c are, rotatably supported by a connecting plate 7. Both ends of the connecting plates 7 are connected to a frame 9 through springs 8a and 8b as biasing means. The press rollers 6a, 6b, and 6c are biased by the springs 8a and 8b to press the drive rollers 5a, 5b, and 5c respectively.

The rotating shafts of the drive rollers 5a, 5b, and 5c rotatably extend through the frame 9. Pulleys 10a, 10b, and 10c are fixed on the rotating shafts, respectively. A rotational force of a motor 11 is transmitted to the pulleys 10a, 10b, and 10c through a motor pulley 12 and timing belts 13a, 13b, and 13c, so that the drive rollers 5a, 5b, and 5c are rotated.

The nonclamped side of the optical card 1 clamped and reciprocated by the roller pairs a, b, and c is urged by a leaf spring 14, and the clamped side of the optical card 1 abuts against the frame 9. Therefore, the optical card 1 receives the driving force upon rotation of the roller pairs a, b, and c and reciprocates along the frame 9.

The head 4 can be moved at a position corresponding to the roller pair b along directions of double-headed arrow D and emits a light beam onto the recording area 2, as shown in FIG. 1B.

In order to reciprocate the optical card 1, the motor 11 is rotated in the opposite directions. Position sensors 15 and 16 are arranged at two ends of the moving range of the optical card 1 so as to provide the reversing timings. A sensor 18 is arranged near a card insertion portion 17 to detect that the optical card 1 has been inserted therefrom.

As shown in FIG. 1C, a gap t1 in the card insertion portion 17 and a thickness t2 of the optical card 1 satisfy relation t2 < t1, and a card having a thickness exceeding a predetermined thickness cannot be inserted in the card insertion portion 17.

In the conventional apparatus described above, since the optical card 1 reciprocates while clamped between the leaf spring 14 and the frame 9, the surface at the nonclamped side of the optical card 1 is deviated in directions (variations in surface level) of double-headed arrow E, as shown in FIG. 1B. For this reason, the distance between the card surface and the head 4 varies. It is thus difficult to always cause a focusing servo circuit to accurately focus the beam from the head 4 onto the optical card 1. As a result, recording and/or reproducing operation is unstable. In the worst case, recording and/or reproduction cannot be performed.

An objective lens in the head 4 may be driven by using an actuator having a wide movable range so as to compensate for the distance variations. However, the control system is complicated, and an expensive actuator must be used. Therefore, the above arrangement does not provide a best solution.

SUMMARY OF THE INVENTION

It is an object of the present invention to solve the conventional problem described above and to provide a card drive mechanism capable of minimizing variations in surface level of a card and an information recording/reproducing apparatus using the card drive mechanism.

According to an aspect of the present invention, there is provided a drive mechanism for reciprocating a card-like information recording medium, comprising:

first guiding means adapted to be brought into contact with one end of the information recording medium parallel to a card reciprocating direction;

second guiding means adapted to be brought into contact with the other end of the information recording medium, the other end defining a plane parallel to a plane of the card reciprocating direction; and at least one roller for obliquely urging a ridge of the other end of the information recording medium, the roller being adapted to urge the information recording medium against the first and second guiding means.

According to another aspect of the present invention, there is provided a drive mechanism for reciprocating a card-like information recording medium, comprising: guiding means for guiding the card-like information recording medium in the card reciprocating direction, and urging means for urging the information recording medium against the guiding means, the information recording medium being urged by a recess formed in the urging means.

DESCRIPTION OF THE PREFERRED EMBODIMENTS

Figure 2A:
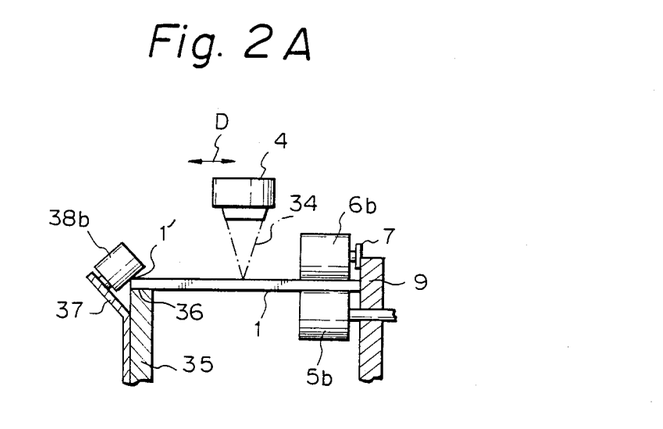
FIG. 2A is a schematic view of a card drive mechanism in an information recording/reproducing apparatus according to an embodiment of the present invention.
Figure 2B:
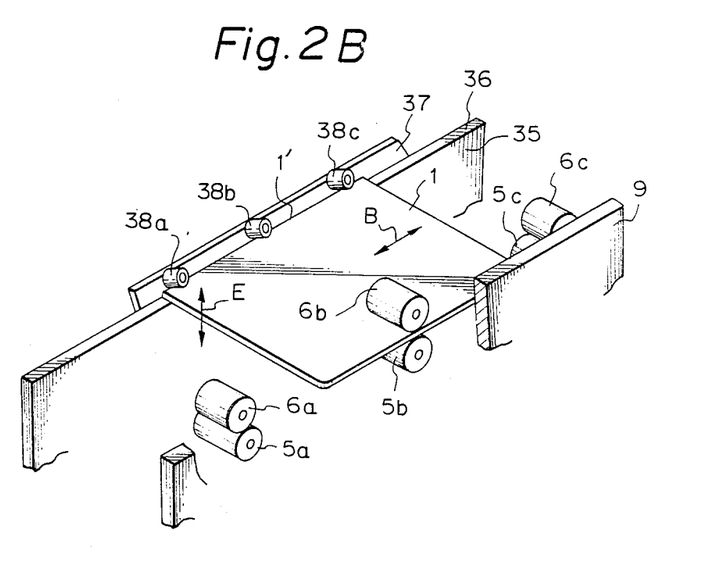
FIG. 2B is a schematic perspective view of the drive mechanism in FIG. 2A.

FIG. 2A is a schematic sectional view of a card drive mechanism in an information recording/reproducing apparatus according to an embodiment of the present invention, and FIG. 2B is a schematic perspective view thereof. The same reference numerals as in FIGS. 1A to 1C denote the same parts in FIGS. 2A and 2B, and a detailed description thereof will be omitted.

Referring to FIGS. 2A and 2B, an optical card 1 clamped by roller pair b receives a driving force in one of the directions of double-headed arrow B upon rotation of the roller pair b. One side edge of the optical card 1 is in contact with a frame 9 as a guiding means. The lower surface portion at the other side edge of the optical card 1 is in contact with a guide surface 36 of a guide frame 35. A plate 37 is fixed on the guide frame 35. Rollers 38a, 38b, and 38c are rotatably mounted on a bent portion (bent at an angle of 45°) of the plate 37. The rollers 38a, 38b, and 38c can be brought into cantact with a ridge 1' of the optical card 1 to obliquely urge the optical card 1.

The optical card 1 is thus positioned by the frame 9 and the guide frame 35 and can stably reciprocate in directions of double-headed arrow 8 without variations in its surface level.

Since the rollers 38a, 38b, and 38c simply urge the optical card 1, they may be made of a material of a high rigidity or elasticity. It is desirable to use an elastic member such as a spring to constitute the plate 37.

Figure 3:
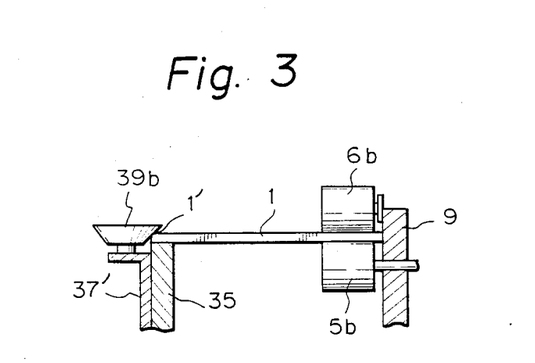
FIGS. 3 and 4 are schematic views respectively showing modifications of the card drive mechanism of FIG. 2A.
Figure 4:
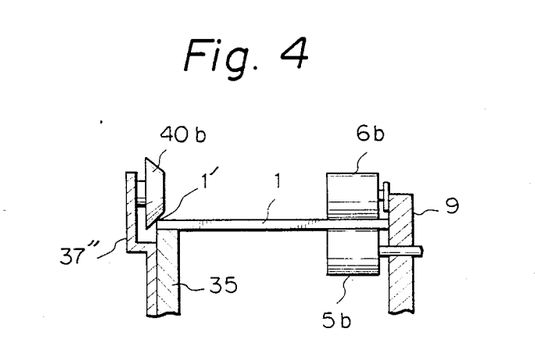

If the rollers 38a, 38b, and 38c obliquely urge the ridge 1 of the optical card, the shape of the rollers are not limited to the one illustrated in FIGS. 2A and 2B but can be modified as shown in FIGS. 3 and 4.

FIGS. 3 and 4 are schematic views showing the modifications of the card drive mechanism in FIGS. 2A and 2B.

As shown in FIG. 3, a plate 37' is fixed on the guide frame 35, and frustoconical rollers 39a, 39b, and 39c are rotatably mounted on the plate 37' to obliquely urge the ridge 1' of the optical card 1.

As shown in FIG. 4, frustoconical rollers 40a, 40b, and 40c are rotatably mounted on a plate 37'' fixed on the guide frame 35 to obliquely urge the ridge 1' of the optical card 1.

Figure 5A:
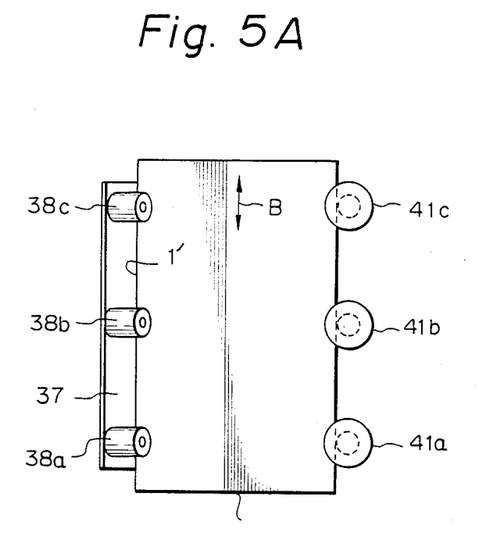
FIG. 5A is a schematic plan view of a card drive mechanism in an information recording/reproducing apparatus according to another embodiment of the present invention.
Figure 5B:
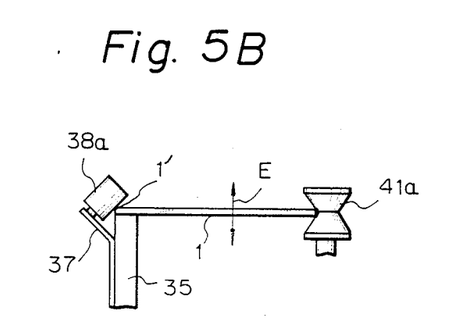
FIG. 5B is a front view of the card drive mechanism in FIG. 5A.

FIG. 5A is a schematic plan view of a card drive mechanism according to another embodiment of the present invention, and FIG. 5B is a front view thereof.

As shown in FIGS. 5A and 5B, rollers 41a, 41b, and 41c serve as the driving and guiding means. An outer surface of each roller which is brought into contact with an optical card 1 constitutes a V-shaped recess. A ridge 1' of the optical card 1 is obliquely urged against a guide frame 35 and the rollers 41a, 41b, and 41c by rollers 38a, 38b, and 38c. Upon rotation of the rollers 41a, 41b, and 41c, the optical card 1 can stably reciprocate without variations in its surface level.

In this embodiment, most of the surface of the card 1 can be used, and a recording area 2, and therefore the recording capacity, can be increased. In addition, since the optical card 1 is not brought into contact with a frame 9, the number of sliding portions and hence the load of the drive system can be reduced.

In each of the card-like recording medium drive mechanisms in FIGS. 2A to 5B, the rollers obliquely urge the ridge of the corresponding card-like information recording medium, and the information recording medium can be firmly urged against the first and second guiding means. In particular, the variations in distance between the surface of the information recording medium and the recording/reproducing head can be eliminated. Therefore, stable reciprocal movement of the information recording medium can be guaranteed.

Accurate focusing can be performed as a result of variation elimination, and reliability of recording and/or reproduction can be greatly improved.

Figure 6A:
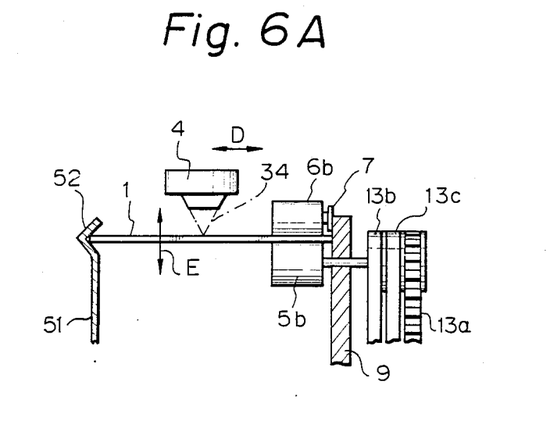
FIG. 6A is a schematic sectional view of a card drive mechanism in an information recording/reproducing apparatus according to still another embodiment of the present invention.
Figure 6B:
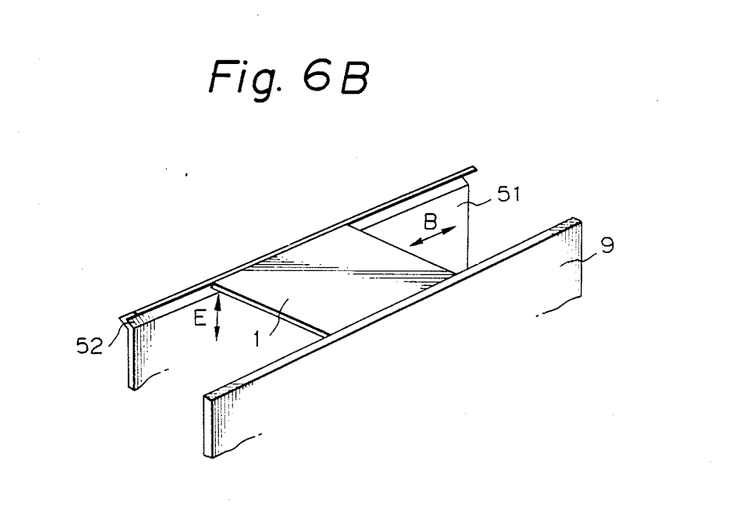
FIG. 6B is a schematic perspective view of a guiding means and an urging means in the card drive mechanism in FIG. 6A.

FIGS. 6A and 6B are views showing a card drive mechanism in an information recording/reproducing apparatus according to still another embodiment of the present invention. FIG. 6A is a schematic view showing the card drive mechanism, and FIG. 6B is a schematic perspective view of guiding and urging means thereof.

The same reference numerals as in FIGS. 1A to 1C denote the same parts in FIGS. 6A and 6B, and a detailed description thereof will be omitted.

Referring to FIGS. 6A and 6B, an optical card 1 clamped by a roller pair b receives a driving force along one of the directions of double-heated arrow B upon rotation of the roller pair b. One side edge (along directions of double-headed arrow B) of the optical card 1 is brought into contact with a frame 9 serving as a guiding means. The other side edge of the optical card 1 is urged along a recess 52 formed in a leaf spring 51. When the optical card 1 reciprocates along one of the directions of double-headed arrow B and is guided by the frame 9, variations in surface level along directions of double-headed arrow E are eliminated, and the distance between the surface of the optical card 1 and a head 4 can be always kept constant.

The recess of the urging means need not be formed by bending the leaf spring 51 as in the following description. Another material (e.g., a plastic material having a low friction coefficient) may be used in consideration of anti-wear and friction load properties of the optical card 1. Alternatively, the shape of the recess may be arbitrarily determined in consideration of the thickness of the optical card 1.

Figure 7:
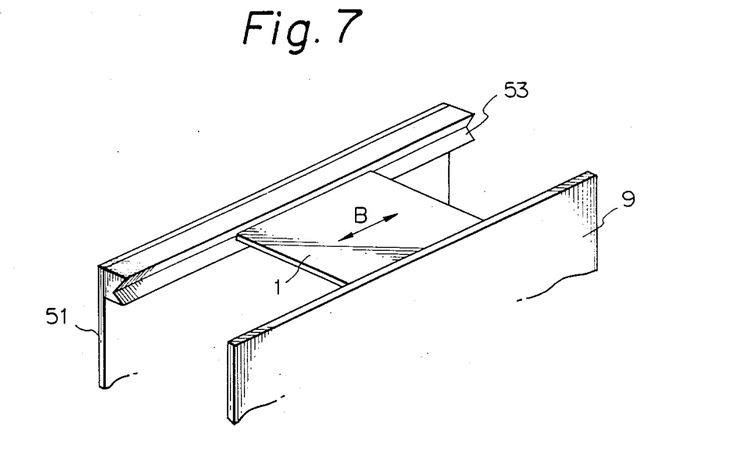
FIGS. 7 and 8 are schematic perspective views respectively showing modifications of the guiding and urging means in the drive mechanism in FIG. 6A.
Figure 8:
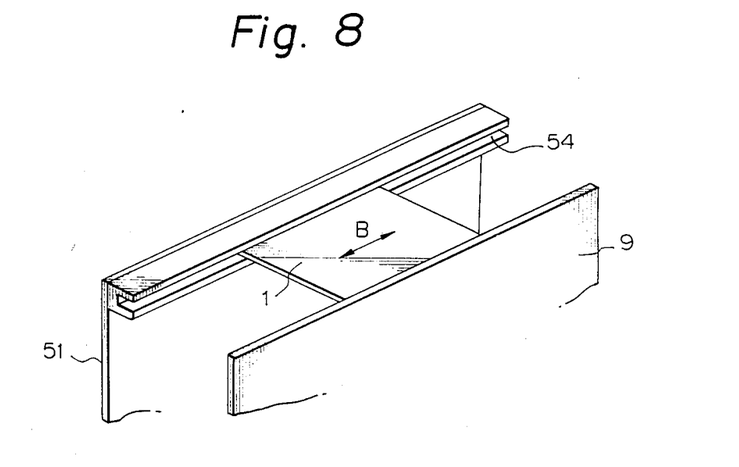

As shown in FIG. 7, a plastic member with a V-shaped recess 53 may be mounted on the leaf spring 51. Alternatively, as shown in FIG. 8, a ,member with a U-shaped recess 54 is mounted on the leaf spring 51, and by this means variations in surface level of the optical card 1 can be further prevented.

Figure 9A:
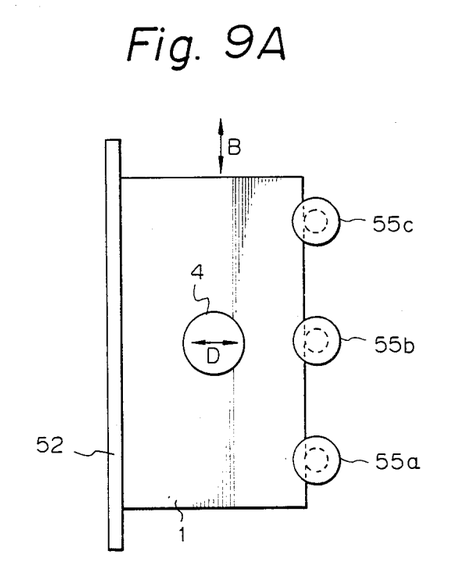
FIG. 9A is a schematic plan view showing guiding and urging means in a drive mechanism in an information recording/reproducing apparatus according to still another embodiment of the present invention.
Figure 9B:
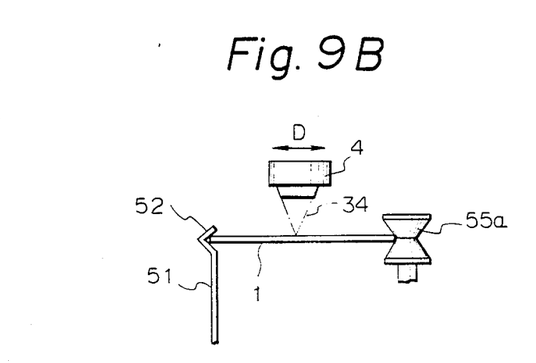
FIG. 9B is a front view of the guiding an urging means in the drive mechanism in FIG. 9A.

FIG. 9A is a schematic plan view of guiding and urging means in a card drive mechanism according to still another embodiment of the present invention, and FIG. 9B is a front view thereof.

In this embodiment, an optical card 1 is urged along a recess 52 in a leaf spring 51 in the same manner as in the embodiment of FIGS. 6A and 6B. However, the roller arrangement for reciprocating the optical card 1 in directions of double-headed arrow B is different from that in the embodiment of FIGS. 6A and 6B.

As shown in FIGS. 9A and 9B, rollers 55a, 55b, and 55c are positioned at proper intervals so as to stably drive the optical card 1. Each roller has a V-shaped outer surface to be brought into contact with the optical card 1. Upon rotation of the rollers 55a, 55b, and 55c, the optical card 1 can reciprocate along directions of double-headed arrow B. In this embodiment the rollers 55a, 55b and 55c serve as both the guiding and driving means. Since the optical card 1 is urged against the V-shaped contact surfaces of the rollers 55a, 55b, and 55c by the recess 52 in the urging means, variations in surface level of the optical card 1 can be prevented.

Figure 10A:
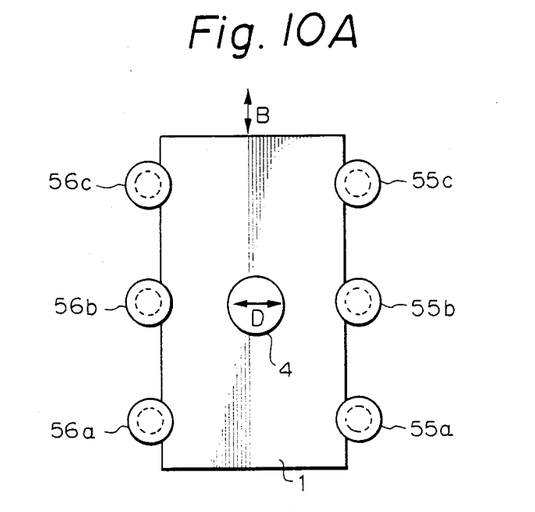
FIG. 10A is a schematic plan view showing guiding and urging means in a card drive mechanism in an information recording/reproducing apparatus according to still another embodiment of the present invention.
Figure 10B:
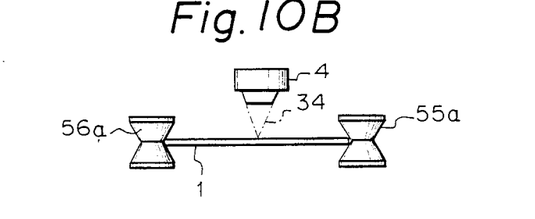
FIG. 10B is a front view of the guiding and urging means in FIG. 10A.
Figure 11:
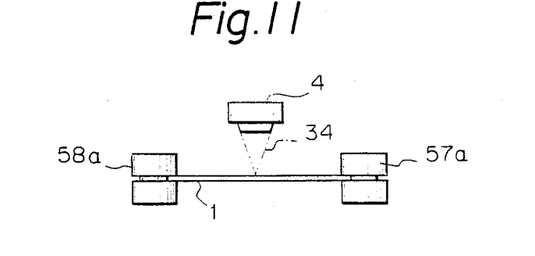
FIG. 11 is a schematic front view showing a modification of the card drive mechanism in FIGS. 10A and 10B.

FIG. 10A is a schematic plan view of guiding and urging means according to still another embodiment of the present invention, FIG. 10B is a front view thereof, and FIG. 11 is a schematic front view showing a modification thereof.

As shown in FIGS. 10A and 10B, the optical card 1 is clamped at its both sides by the rollers 55a, 55b, and 55c each with a V-shaped card contact surface and rollers 56a, 56b, and 56c. The rollers at one side serve as press rollers. The driving rollers for reciprocating the optical card 1 along the directions of double-headed arrow B may be the rollers of either side. The optical card 1 in this embodiment is urged by the rollers 56a, 56b, and 56c each with the V-shaped card contact surface and can be guided to reciprocate along directions of double-headed arrow B.

The shape of the roller may be of rollers 57a, 57b and 57c and rollers 58a, 58b, and 58c, as shown in FIG. 11. These rollers respectively have annular guide grooves for receiving the optical card 1. With this arrangement, variations in surface level of the optical card 1 can be more effectively prevented.

The drive mechanism for clamping the optical card 1 at both sides thereof by the rollers guarantees the wide area of the surface of the card 1 and the recording area 2, thereby greatly increasing the recording capacity.

The card-like information recording medium is urged along the recess in the urging means, variations in surface level of the optical card 1 in a direction perpendicular to the reciprocal movement plane for the information recording medium can be prevented, and stable reciprocal movement of the recording medium can be performed. As a result, accurate focusing can be performed, and reliability of recording and/or reproduction can be greatly improved.

Figure 12:
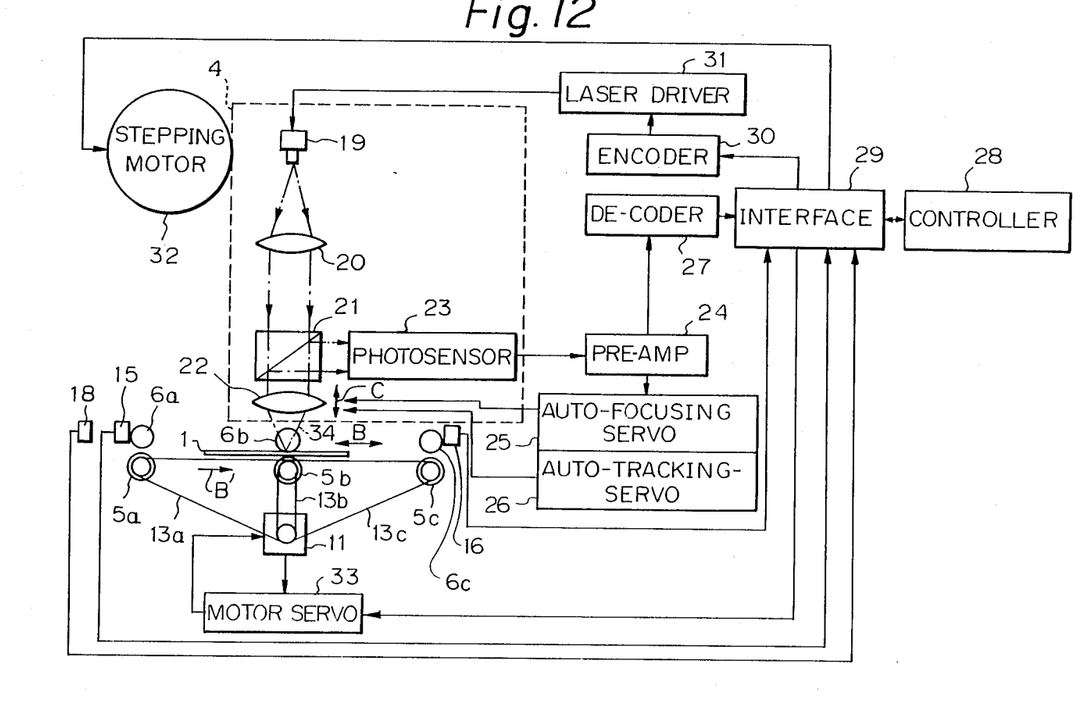
FIG. 12 is a diagram showing an information recording/reproducing apparatus according to still another embodiment of the present invention.

FIG. 12 is a view showing an information recording-/reproducing apparatus with a card drive mechanism of the present invention.

Referring to FIG. 12, a head 4 comprises a laser 19, a collimator lens 20, a beam splitter 21, an objective lens 22, and a photosensor 23. An output from the photosensor 23 is input to a preamplifier (PRE-AMP) 24. By using an output from the preamplifier 24, auto-focusing (to be referred to as an AF hereinafter) and auto-tracking (to be referred to as an AT hereinafter) are respectively performed by an AF servocircuit 25 and an AT servo circuit 26. More specifically, the objective lens 22 is moved in one of the directions of double-headed arrow C by the AF servo circuit to focus a beam 34. The objective lens 22 is slightly moved by the AT servo circuit 26 in one of the directions of double-headed arrow B to allow the beam spot to trace each information track 3.

The output from the preamplifier 24 is decoded by a decoder (DE-CODER) 27, and the decoded signal is output to an external device through an interface 29 on the basis of an instruction from a controller 28.

In order to record information, the information is encoded by an encoder 30 to drive a laser driver 31, and a high-power modulated beam is output from the laser 19 to form a pit train in a recording area 2 of the optical card 1. The head 4 can be driven by a stepping motor 32 in directions of double-headed arrow B. A motor 11 for reciprocating the optical card 1 is controlled by a motor servo circuit 33 on the basis of outputs from positions sensors 15 and 16, and a sensor 18.

In the above description, the optical card is exemplified. However, the card drive mechanism of the present invention is applicable to a magnetic card. The present invention is also applicable to a ROM card drive mechanism for only reproduction when a ROM card is used as an optical card.

We claim:

1. An apparatus for recording and/or reproducing information comprising:
   a head for carrying out recording and/or reproduction of the information;
   means for reciprocating an information recording medium relative to said head;
   guide means for guiding the recording medium in a direction of the reciprocation of the recording medium; and urging means for obliquely urging at least a ridge of one of opposite ends of the recording medium so as to urge the recording medium against said guide means.

2. An apparatus according to claim 1 wherein said urging means includes a recessed portion by which the recording medium is urged against said guide means.

3. An apparatus for recording and/or reproducing information comprising:

a head for carrying out recording and/or reproduction of the information;

means for reciprocating an information recording medium relative to said head;

first guide means for coming into contact with one of opposite ends of the recording medium extending in a direction of the reciprocation of the recording medium;

second guide means for coming into contact with a plane of the recording medium near the other of said opposite ends; and urging means for obliquely urging a ridge of said the other end of the recording medium so as to urge the recording medium against said first and second guide means.

4. An apparatus according to claim 3 wherein said urging means comprises at least one roller.

5. An apparatus according to claim 1 wherein said urging means obliquely urges both ridges of said one of the opposite ends of the recording medium.

6. An apparatus according to claim 1 wherein said guide means comes into contact with both ridges of the other of said opposite ends of the recording medium.

* * * * *

UNITED STATES PATENT AND TRADEMARK OFFICE
CERTIFICATE OF CORRECTION

PATENT NO. : 4,825,059
DATED : April 25, 1989
INVENTOR(S) : HITOSHI KURIHARA, ET AL.

It is certified that error appears in the above-identified patent and that said Letters Patent is hereby corrected as shown below:

COLUMN 1

Line 23, "has" should read --have--.
Line 51, "are," should read --are--.
Line 52, "plates 7" should read --plate 7--.

COLUMN 3

Line 40, "an" should read --and--.

COLUMN 4

Line 6, "can-" should read --con- --.
Line 18, "are" should read --is--.

COLUMN 5

Line 6, "double-heated arrow B" should read --double-headed arrow B--.
Line 28, ",member" should read --member--.
Line 63, "side serve" should read --side (the rollers 56a, 56b, and 56c in this embodiment) serve--.

UNITED STATES PATENT AND TRADEMARK OFFICE
CERTIFICATE OF CORRECTION

PATENT NO. : 4,825,059
DATED : April 25, 1989
INVENTOR(S) : HITOSHI KURIHARA, ET AL.

It is certified that error appears in the above-identified patent and that said Letters Patent is hereby corrected as shown below:

COLUMN 6

Line 3, "be of" should read --be that of--.
Line 51, "positions" should read --position--.

Signed and Sealed this

Twenty-first Day of May, 1991

Attest:

HARRY F. MANBECK, JR.

*Attesting Officer*     *Commissioner of Patents and Trademarks*